United States Patent
Kurki (10) Patent No.: US 11,186,948 B2
(45) Date of Patent: Nov. 30, 2021

(54) METHOD AND A SYSTEM FOR PRODUCTION OF HIGH MOLECULAR WEIGHT LIGNIN

(71) Applicant: FIBRATECH PTE. LTD, Singapore (SG)

(72) Inventor: Matti Kurki, Jyväskylä (FI)

(73) Assignee: FIBRATECH PTE. LTD, Singapore (SG)

( * ) Notice: Subject to any disclaimer, the term of this patent is extended or adjusted under 35 U.S.C. 154(b) by 106 days.

(21) Appl. No.: 16/302,725

(22) PCT Filed: May 27, 2016

(86) PCT No.: PCT/IB2016/053111
§ 371 (c)(1),
(2) Date: Nov. 19, 2018

(87) PCT Pub. No.: WO2017/203329
PCT Pub. Date: Nov. 30, 2017

(65) Prior Publication Data
US 2019/0292725 A1    Sep. 26, 2019

(51) Int. Cl.
| | |
|---|---|
| D21C 3/02 | (2006.01) |
| D21C 1/00 | (2006.01) |
| D21C 7/00 | (2006.01) |
| D21C 7/14 | (2006.01) |
| D21C 3/24 | (2006.01) |
| D21C 7/12 | (2006.01) |
| D21C 11/00 | (2006.01) |

(Continued)

(52) U.S. Cl.
CPC ............... *D21C 3/02* (2013.01); *D21C 1/00* (2013.01); *D21C 3/22* (2013.01); *D21C 7/00* (2013.01); *D21C 7/12* (2013.01); *D21C 7/14* (2013.01); *D21C 11/0007* (2013.01); *C08L 97/005* (2013.01); *D01F 9/17* (2013.01); *D21C 3/24* (2013.01)

(58) Field of Classification Search
CPC ............... D21C 1/06; D21C 1/00; D21C 7/14
See application file for complete search history.

(56) References Cited

U.S. PATENT DOCUMENTS

| | | | |
|---|---|---|---|
| 2,355,091 A | | 8/1944 | McDonald |
| 2,582,054 A | * | 1/1952 | Michon ............... D21C 7/06 |
| | | | 162/69 |

(Continued)

FOREIGN PATENT DOCUMENTS

| | | |
|---|---|---|
| AU | 2010202496 A1 | 1/2012 |
| CA | 2437616 A1 | 2/2005 |

(Continued)

OTHER PUBLICATIONS

Smook, Handbook for Pulp and Paper Technologists, 1992, Angus Wilde Publications, 2nd edition, chapters 9 and 13. (Year: 1992).*

(Continued)

*Primary Examiner* — Anthony Calandra
(74) *Attorney, Agent, or Firm* — Ziegler IP Law Group, LLC (57) ABSTRACT

A cooking method and a digester system wherein partly digested cellulosic fiber source is compressed during cooking to provide high molecular weight lignin and pulp.

8 Claims, 4 Drawing Sheets

(51) Int. Cl.
*D21C 3/22* (2006.01)
*C08L 97/00* (2006.01)
*D01F 9/17* (2006.01)

(56) References Cited

U.S. PATENT DOCUMENTS

| | | | |
|---|---|---|---|
| 4,556,452 A | | 12/1985 | Raggam |
| 4,869,783 A | | 9/1989 | Prusas et al. |
| 5,589,033 A | * | 12/1996 | Tikka ................. D21C 3/26 162/84 |
| 5,779,856 A | | 7/1998 | Kettunen |
| 8,623,175 B2 | * | 1/2014 | Rolland .............. B30B 9/06 162/42 |
| 2008/0057307 A1 | | 3/2008 | Koslow |
| 2011/0126448 A1 | | 6/2011 | Dumenil |
| 2011/0277947 A1 | | 11/2011 | Xunjun |
| 2013/0105097 A1 | | 5/2013 | Joutsimo |
| 2014/0196859 A1 | * | 7/2014 | Kallmes ............... D21C 7/14 162/242 |
| 2014/0242867 A1 | | 8/2014 | Jansen et al. |
| 2015/0073131 A1 | | 3/2015 | Peterson |
| 2015/0233023 A1 | | 8/2015 | Chang |

FOREIGN PATENT DOCUMENTS

| | | |
|---|---|---|
| EP | 2622128 A1 | 8/2013 |
| JP | S52148201 A | 12/1977 |
| JP | 2014508866 A | 4/2014 |
| JP | 2016079524 A | 5/2016 |
| WO | 2012007642 A1 | 1/2012 |
| WO | 2012158075 A1 | 11/2012 |
| WO | 2014147293 A1 | 9/2014 |

OTHER PUBLICATIONS

Notice of Reasons for Refusal, Japanese Application No. 2018562167, dated Dec. 26, 2019, 4 Pages.
Written opinion of the International Search Authority, Application No. PCT/IB2016/053111 dated Jan. 26, 2017, 11 Pages.
International Search Report, Application No. PCT/IB2016/053111 dated Jan. 26, 2017, 6 Pages.
Office Action issued in Russian Application No. RU2018144689 dated Nov. 29, 2019, 13 pages, 5 pages of English Translation attached.
Salmen, Lennart, "Temperature and Water Induced Softening Behaviour of Wood Fiber Based Materials", A22810463B, Department of Paper Technology, 1982, 58 pages.
Republic of Colombia, Office Action, Application No. NC2018/0012416, dated Mar. 15, 2021, dated Mar. 7, 2021.

* cited by examiner

METHOD AND A SYSTEM FOR PRODUCTION OF HIGH MOLECULAR WEIGHT LIGNIN

FIELD

The present disclosure relates to a cooking method and a digester system for producing high molecular weight lignin and pulp from a cellulosic fiber source. The pulp produced according to the cooking method is useful for tissue, fluff, filter paper, fine paper and coated fine paper, décor paper, multilayer board, dissolving pulp and/or high fines content cellulose products.

BACKGROUND

Lignin is used as fuel to provide energy in the pulping process. Moreover, lignin is used to prepare various lignin derivatives such as adhesives, carbon fiber, activated carbon and carbon black. The molecular weight of the lignin is an important factor which determines lignin properties and possible uses in manufacturing lignin derivatives. One important property defined by lignin molecular weight is the heat value of the lignin. High molecular weight lignin has a high heat value, and is thus more advantageous as a fuel than lower molecular weight lignin.

In Kraft process cellulose and lignin containing raw material is cooked in a digester. During cooking lignin polymers are released by breaking the bonds linking the lignin polymers to cellulose. The temperature and alkali required in the cooking conditions also have an effect on lignin polymers that are degraded to lignin having a lower molecular weight. Lignin diffuses from inside the raw material to the cooking liquor when the lignin polymer has degraded to a size smaller than the void spaces created by cooking the cellulose containing raw material. Thus, longer cooking times result into decreased molecule size of lignin obtained into the black liquor. Further, prolonged cooking time also increases the dissolution of hemicellulose into the cooking liquor which further decreases the heating value of the lignin. Current art digester system for cooking a cellulosic fiber source comprise:
i. cooking the cellulosic fiber source in a cooking liquor;
ii. Extracting of cooking liquor and cooling pulp with displacement liquor (optional)
iii. Discharging pulp and washing liquor form digester.

With current Kraft pulping processes, such as the one disclosed in PCT/FI2011/050651, it is not possible to produce high molecular weight lignin: because of the long cooking time and high temperature required in the existing cooking processes, lignin in the black liquor degrades to low molecular weight so that only low molecular weight lignin can be recovered with the known processes. In current processes the chip column is not pressed together after washing and only the low molecular weight lignin is removed. Further, a substantial amount of lignin is left inside the wood chips and, consequently lignin yield is low. Further, the recovery of lignin from the pulping process with current methods involves high energy consumption. Lignin can be removed from black liquor by precipitation as known for the artesan in the field of chemical pulping or processes such as LignoBoost™.

Further, in current cooking systems low column porosities, i.e. compressed columns, are avoided because below a porosity of 0.25 black liquor cannot flow inside the chip columns. When black liquor flow is prevented, cooking of the wood chips becomes impossible and the cooking reaction products are not transported from the inside of the wood chip to the free liquor outside of the wood chip column. Thus, current cooking systems have to secure free flow of the cooking liquor in order to keep the cooking process uninterrupted and, consequently, current cooking systems avoid any process step which compresses the chip column or risks blocking the free flow of the liquor in the digester.

Compressed chip and pulp columns are also avoided in the current processes because when the free flow between chip or fibers is restricted, that will increase pressure difference over the column, resulting into channeling. Channeling of the cooking or washing liquor will cause variation of cooking temperature and depletion of alkali in the compressed column area. It also decreases washing efficiency after cooking which will lead into poor wash efficiency and the lignin yield in the displaced liquor will decrease.

Cellulose is a material used e.g. for tissue, fluff, filter paper, fine paper and coated fine paper, décor paper, multilayer board, dissolving pulp and high fines content cellulose comprises cellulosic fibers and fines (fines parts of fiber with high length to width ratio) or fines. Tissue, fluff, filter paper, fine paper and coated fine paper, décor paper, multilayer board, dissolving pulp and/or high fines content cellulose products production processes are generally based on treating chemical cellulose fibers.

For tissue products an important property is softness of the product. In order to improve this property usually increased consumption of softening agent is required in production. For fluff products, an important property is water absorbance of the product. For filter papers, an important property is porosity of the product. Significant amounts of water are also consumed and effluents are generated in these processes, thus creating a significant environmental load.

For coated and uncoated fine paper products an important property is high filler content of the product while maintaining the same thickness of the product. In order to increase filler content at constant thickness, usually increased chemical and/or enzyme consumption and the energy consumption is observed in the fine coated and uncoated paper production. Significant amounts of water are also consumed and effluents are generated in these processes, thus creating a significant environmental load.

For décor paper products an important property is dimensional stability of the base paper product. Usually increased chemical and/or enzyme consumption and energy consumption is required in production of the fine coated and uncoated paper. Significant amounts of water are also consumed and effluents are generated in these processes, thus creating a significant environmental load.

For multilayer board products an important property is high dry solids content after the press section at constant bonding level of the middle layer in the product. In order to improve this property usually increased chemical and/or enzyme consumption and the energy consumption is required in the fine coated and uncoated paper production. Significant amounts of water are also consumed and effluents are generated in these processes, thus creating a significant environmental load.

For dissolving pulp/cellulose products an important property is Fock reactivity. In order to improve this property usually increased chemical and/or enzyme consumption and the energy consumption is required in the dissolving pulp/cellulose production. Significant amounts of water are also consumed and effluents are generated in these processes, thus creating a significant environmental load.

For high fines content cellulose products an important property is the amount of fines in the cellulose product for increasing delamination resistance of the product. In order to improve this property usually increased chemical and/or enzyme consumption and the energy consumption is observed in the fine coated and uncoated paper production. Significant amounts of water are also consumed and effluents are generated in these processes, thus creating a significant environmental load.

US-publication 2011/0277947 A1 presents a method for production of cellulose tissue paper. The method uses a peeling agitator with a high velocity blade which is stated to produce longer cellulose nanofilaments compared to the prior methods.

US publication 2008/0057307 A1 teaches a method for production of coated or uncoated fine paper. The raw materials useable in the embodiments can be selected from cellulose, acrylic and polyester fibers.

CA publication 2437616 A1 teaches a method for production décor base paper. The raw materials useable in the embodiments can be selected from cellulose, acrylic and polyester fibers. The method comprises of passing fibers trough high shear in a double disc refiner.

In publication U.S. Pat. No. 4,869,783 a multilayer board products important property is porosity. To remove a majority of the lignin in the chips, the chips are subjected to chemical pulping at an elevated temperature.

CA publication 2437616 A1 teaches a method for high fines content cellulose production with low energy consumption. The raw materials useable in the embodiments can be selected from cellulose, acrylic and polyester fibers. The method comprises of passing fibers trough high shear in double disc refiner.

Publication WO/2012/007642A1 presents method for pressing and shearing impregnated wood chips with segmented plates. The raw materials useable in the embodiments are selected from eucalyptus wood. WO/2014/147293A1 presents method to press and shear impregnated wood chips to fiber cross direction of the wood chip so that cell wall is modified.

Despite the above attempts there remains a need in the industry of providing methods to separate high molecular weight lignin, and to provide high quality pulp from cellulosic fiber source.

SUMMARY

In one embodiment, the aspects of the disclosed embodiments are directed to an environmentally friendly cooking method of cellulosic fiber source which provides pulp and high molecular weight lignin.

In one embodiment, the aspects of the disclosed embodiments are also directed to a method of producing pulp from a cellulosic fiber source, which consumes low amount of energy when transformed into high fines content pulp.

In a further embodiment, the aspects of the disclosed embodiments are directed to a cooking system for cellulosic fiber source which provides and pulp high molecular weight lignin.

In yet another embodiment, the aspects of the disclosed embodiments are directed to enhanced final product properties and higher productivity.

The aspects of the disclosed embodiments are directed to a new technical alternative.

The aspects of the disclosed embodiments may be obtained by the invention as defined in the independent claims. The aspects of the disclosed embodiments are directed to decreasing cooking time and producing high molecular weight lignin. The embodiments described in the following provide further advantages.

According to a first aspect there is provided a cooking method for a cellulosic fiber source comprising:
i. Cooking the cellulosic fiber source in a cooking liquor;
ii. compressing the cellulose fiber source to provide a compressed cellulose fraction in a black liquor comprising high molecular weight lignin;
iii. displacing the black liquor with a displacing liquor;
iv. recovering the high molecular weight lignin fraction from the black liquor and the displacing liquor;
v. and recovering pulp from the compressed cellulose fraction.

Compared to prior art cooking processes, such as the one disclosed in PCT/FI2011/050651, the compressing and displacing steps in the method of the first aspect provide higher lignin yield and lignin concentration in the extracted liquor, which decreases the energy consumption in the evaporation of the black liquor, as evidenced by Example 6.

The compressing and displacing steps increase molecular weight of produced lignin. Increased molecular weight of the recovered lignin increases heat value of the recovered lignin fraction. The Example 1 shows results from different wood pulps and confirms increase of lignin molecular weight by using the present process.

Further, the cooking method according to the first aspect may improve cellulose yield of the cooking process and decrease wood consumption, cooking time, and the amount of water in the lignin containing fraction, which results into a lower energy consumption in evaporation. This is evidenced by the data shown in Example 1.

According to a second aspect there is provided high molecular weight lignin fraction obtainable using the cooking method of the first aspect.

The high molecular weight lignin fraction has increased molecular weight compared to the one produced according to prior processes, such as the one disclosed in PCT/FI2011/050651. Comparative results in Example 6 also show that a better lignin yield and higher consistency can be obtained using the present method.

According to a third aspect there is provided a use of the high molecular weight lignin fraction produced according to the second aspect in producing energy, carbon fiber, resin, activated carbon or carbon black.

According to a fourth aspect there is provided pulp obtainable using the cooking method of the first aspect.

When pulp is produced according to prior processes, such as the one disclosed in PCT/FI2011/050651, wood chips are pressed and sheared by segmented plate into undefined direction of the wood chip. This increases the fiber curl of the pulp, which decreases tensile index of the pulp. When the cellulosic fiber source is a wood chip, the compression in the present method is preferably applied to the wood chip on the side of the wood chip having a higher surface area i.e. this is the flat side of the wood material. This results in lower fiber curl. Comparative results in Example 7 show that lower fiber curl can be obtained using the present method.

According to a fifth aspect there is provided a use of the pulp of the fourth aspect in manufacturing paper, board or cellulose with high fines content.

The pulp according to the fourth aspect may increase dry matter content of board after press section in board manufacturing. Further, when pulp according to the fourth aspect is used in producing tissue paper, softness of the tissue product is surprisingly increased.

Further, when pulp according to the fourth aspect is used in producing pulp for fluff pulp applications, the energy demand of fiberizing in Hammer mill is surprisingly decreased and fiberizing percentage is surprisingly increased. Also the water absorption capacity of the fiberized pulp surprisingly increases.

Dimensional stability of the décor paper and fine papers products have also been surprisingly found to increase when pulp according to the fourth aspect has been used in their production. When pulp according to the fourth aspect is used in producing filter paper, porosity of the filterability product is surprisingly increased.

According to a sixth aspect there is provided a method for producing pulp with high fines content comprising:
a. producing pulp according to the cooking method of the first aspect; and
b. refining the pulp recovered in the step v.

The amount of fines was surprisingly found to increase when pulp produced according to the first aspect was refined. The resulting pulp is characterized by high amount of fines, or small pieces of cellulose fiber wall constituents. The fines or pieces of cellulose fiber wall constituents may have a number average width between 1 nm and 1000 nm. The fines or pieces of cellulose fiber wall constituents may have a number average length between 1 nm and 4 mm.

According to a seventh aspect there is provided pulp with high fines content produced according to the method of the sixth aspect.

According to an eighth aspect there is provided a digester system for cooking a cellulosic fiber source comprising:
i. a digester for cooking the cellulosic fiber source in a cooking liquor to a kappa number selected from a range between 100 and 5, at a cooking temperature selected from a range between 120° C. and 180° C.;
ii. a compressor for compressing the cellulose fiber source at a cooking temperature to a consistency higher than 10% by weight
iii. a displacement zone for providing a column comprising cellulose fraction having a consistency of at least 5% in a black liquor comprising high molecular weight lignin;
iv. at least one fluid connection for adding displacing liquor into the displacement zone for displacing the black liquor with a displacing liquor having a lower lignin content than the black liquor;
v. at least one first outlet for recovering the high molecular weight lignin fraction from the black liquor and the displacing liquor; and
vi. a second outlet for recovering the cellulose fraction.

According to an eighth aspect there is provided a digester system for cooking a cellulosic fiber source comprising:
i. a digester unit for cooking the cellulosic fiber source in a cooking liquor to a kappa number selected from a range between 100 and 5, at a cooking temperature selected from a range between 120° C. and 180° C.;
ii. a displacement vessel comprising
   a compressing unit and a displacement zone; and
a. a compressor for compressing the cellulose fiber source at a cooking temperature to a consistency higher than 10% by weight to provide a column comprising cellulose fraction in a black liquor comprising high molecular weight lignin;
b. at least one fluid connection for adding a displacing liquor to the displacement vessel;
c. at least one outlet in the displacement vessel for recovering the high molecular weight lignin fraction;
iii. a transfer line connecting the digester unit to the compressing unit of the displacement vessel;
iv. a dilution zone for diluting the cooked wood chips;
v. at least one fluid connection for connecting the displacement vessel to the dilution zone; and
vi. a second outlet for recovering the cellulose fraction from the dilution zone.

Embodiments of the present disclosure provide certain benefits. Depending on the embodiment, one or several of the following benefits may be achieved: decreased consumption of chemicals, water, cellulosic fiber source, and energy; improved yield of cellulose, increased molecular weight of lignin and improved yield of high fines in cellulose after refining.

DETAILED DESCRIPTION

The present method and apparatus are applicable in both continuous and batch Kraft processes. The stages in the continuous Kraft cooking processes include pre-hydrolysis, impregnation, transfer circulation and cooking. In the batch cooking processes the treatment of the present invention can be done at the same process stages as in the continuous process, i.e. during cooking.

Suitable raw materials include any type of cellulosic fiber source, which contains lignin, such as wood material, non-wood material, and mixtures thereof. The cellulosic fiber source may comprise or consist of particles, saw dust, pieces or chips. The cellulosic fiber source is preferably in the form of wood pieces or wood chips. Wood materials include any hardwood, any softwood, birch, aspen, pine, spruce and mixtures thereof. The wood chips may be treated, or impregnated, in alkaline or acidic conditions before use in the present methods. Suitable non-wood fibers include cellulosic fibers other than wood, which are applicable to pulping, such as bagasse and hemp.

As used herein, "pre-hydrolysis and neutralization" refers to the pre-cooking phase of the Kraft process of chemical pulping. Pre-hydrolysis and neutralization phase is preferably carried out in a digester.

As used herein, "cooking" refers to the cooking phase of the Kraft process of chemical pulping. Cooking phase is preferably carried out in a digester.

As used herein, "compressing" and "compressing of wood chips according to the invention" refers to applying, during the cooking step, compressing treatment which is conventionally absent from the Kraft process. In an embodiment compressive force is applied to the partially cooked cellulosic fiber source to create a compressed cellulose fraction and black liquor comprising high molecular weight lignin.

When the cellulosic fiber source is a wood chip, the compression is preferably applied to the wood chip on the side of the wood chip having a higher surface area i.e. this is the flat side of the wood material.

Preferably the compressing treatment is done by compressing wood chips so that all or substantially all void spaces of the wood chips are compressed and liquor together with lignin inside the wood chips are entirely or to a significant extent (e.g. more than 50%, 70% or 90%) compressed out of the void spaces in the wood chips. Preferably compression is applied to achieve a compressed wood chip density of 1525 kg/m³.

Compressing is usually started when cooking is 0-40 units above a desired kappa value is reached in previous art PCT/FI2011/050651 pressing and shearing was started after the lignin, hemicelluloses and cellulose reached their softness points i.e. compression is started before when the wood chip during cooking reaches porosity level less than 0.83. In the current invention the lining is pressed out from the cell wall and displaced with displacement liquor to be recovered.

In an embodiment the cellulosic fiber source is partially cooked when compression is started. The compression is preferably carried out at the cooking temperature, or near it. The compressing step can be carried out inside the digester or in a separate vessel into which the partially cooked cellulosic fiber source is transferred.

Non-limiting examples of suitable means for applying compression in step ii. of the first aspect include rotating cylinders, a rotating cylinder in a pipe, a piston or a screw which compresses the cellulosic fiber source. Compression step is provided by gap which is smaller than the width of the wood chip or several wood chips between e.g. rotating cylinders and rotating cylinder in a pipe in which, the wood material turns to the flat side of the raw material in order go through the gap. A person skilled in the art can readily find other means for applying the compressing as defined above on the cellulosic fiber source. Preferable embodiments comprise compressing means that provide compressed cellulosic fiber source in a form, which is easily subjected to the displacing step iii.

For example, column pressing can be carried out to provide a column of solids having a consistency higher than in the displacement liquor. The column pressing enhances the following displacement step, decreases the liquor consumption in the displacement, and increase high molecular weight lignin concentration in the displaced black liquor, which enhances the recovery of high molecular weight lignin.

The digester, wherein the cooking is carried out, comprises, for example, one digester vessel or two digester vessels. Non-limiting examples of such systems are illustrated in the schematic figures FIG. 1 and FIG. 2.

As used herein, cooking liquor means the fresh or recirculated liquor added in the cooking phase to the digester. The cooking liquor comprises alkali charge of 10-40% effective alkali as NaOH. In another embodiment the cooking liquor comprises about 10%, 25%, 30%, 35% or 40% effective alkali as NaOH. In an alternative embodiment, KOH is used to replace NaOH.

As used herein, black liquor means the liquor formed during cooking when components of the cellulosic fiber source are dissolved from into the cooking liquor. During compressing black liquor, together with high molecular weight lignin, moves to the exterior of the void spaces.

The compressed cellulosic fiber source column can be diluted to a consistency selected from the range between 2 and 35% by weight, such as 2%, 3%, 4%, 5%, 6%, 7%, 8%, 9%, 10%, 15%, 20%, 25%, 30%, or 35% by weight.

After compressing, the black liquor is displaced by the displacing liquor having a lower lignin content than the black liquor. The black liquor is thus displaced from the digester in which the column comprising the cellulose fraction is. The displacement can be carried out using a counter current or concurrent of the displacement liquor. In an embodiment the displacement liquor comprises an alkali charge selected from the range between 1% and 40% effective alkali as NaOH. The temperature during displacement can be selected from the range between 50° C. and 200° C. The displacement can be carried out in a consistency selected from the range between 5% and 50%.

In an embodiment the method comprises optional pre-hydrolysis and neutralization before step i.

In an embodiment the optional pre-hydrolysis comprises pre-hydrolyzing cellulosic fiber source with steam at a temperature between 100° C. and 200° C. and neutralizing is carried out subsequently with an alkali charge selected between 1% and 25% effective alkali as NaOH.

In an embodiment the optional pre-hydrolysis step comprises pre-hydrolyzing cellulosic fiber source with steam at temperatures between 100° C. and 200° C. and after that neutralization step with alkali charge 1%, 3%, 6%, 9%, 15%, 20%, or 25% effective alkali as NaOH.

In an embodiment of the first aspect in step
i. the cellulosic fiber source is cooked to a kappa number selected from a range between 100 and 5, at a cooking temperature selected from a range between 120 and 180° C.; and in step
ii. the compressing is carried out at the cooking temperature and to a consistency higher than 10% by weight.

In an embodiment of the first aspect the alkali charge in step i. an alkali charge of 10%, 15%, 20%, 25%, 30%, 35% or 40% as effective alkali as NaOH is used.

In an embodiment of the first aspect step ii. is initiated when the black liquor lignin concentration is at least 15 g/l. In another embodiment step ii. is initiated when kappa value has reached 100, 95, 90, 85, 80, 75, 70, 65, 60, 55, 50, 45, 40, 35, 30, 25, 20, 15, 14, 13, 12, 11, 10, 9, 8, 7, 6, or 5 and the black liquor lignin concentration is at least 15 g/l.

In an embodiment of the first aspect in step ii. the compressive pressure applied on the cellulosic fiber source is a value selected between 35 kPa and 1000 kPa, such as 35 kPa, 40 kPa, 45 kPa, 50 kPa, 55 kPa, 60 kPa, 65 kPa, 70 kPa, 75 kPa, 80 kPa, 85 90 kPa, 95 kPa, 100 kPa, 200 kPa, 250 kPa, 300 kPa, 400 kPa, 500 kPa, 600 kPa, 700 kPa, 800 kPa, 900 or 1000 kPa. The target dry matter content of the cellulosic fiber source in compressing is preferably more than 10% by weight, such as a value selected from the range between 10% and 99% by weight, preferably between 30% and 99% by weight, and more preferably between 50% and 99% by weight, such as 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 96%, 97%, 98%, or 99% by weight. The pressure applied in step ii. can be selected as appropriate to obtain any practical dry matter content above 10%.

In an embodiment of the first aspect, step iii. comprises pressing the cellulosic fiber source in the black liquor with a pressure selected from the range between 1 and 250 kPa to form a column of solids having a consistency of at least 5% by weight, followed by displacing the black liquor with a displacing liquor having a lignin content lower than in the black liquor. Non-limiting examples of suitable pressures to reach the selected target consistency value are 1 kPa, 2 kPa, 3 kPa, 4 kPa, 5 kPa, 6 kPa, 7 kPa, 8 kPa, 9 kPa, 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, and 250 kPa. Non-limiting examples of suitable consistency values are 5%, 6%, 7%, 8%, 9%, 10%, 15%, 20%, 25%, 30%, 35%, 40%, 45% and 50% by weight.

In an embodiment the pressing, when used in step iii. of the first aspect, is carried out by using a screw, a pump or high a pressure feeder.

In an embodiment of the first aspect the pressure applied in step iii. is lower than in step ii.

In an embodiment of the first aspect the cellulosic fiber source comprises or consists of wood chips, preferably softwood or hardwood chips, such as eucalyptus, pine or spruce.

In an embodiment of the first aspect the cellulosic fiber source comprises or consists of wood chips and the wood chips are compressed in step ii. to a density selected from the range between 350 kg/m$^3$ and 2000 kg/m$^3$, preferably between 350 kg/m$^3$ and 1525 kg/m$^3$, such as 350 kg/m$^3$, 360 kg/m$^3$, 370 kg/m$^3$, 380 kg/m$^3$, 390 kg/m$^3$, 400 kg/m$^3$, 410 kg/m$^3$, 420 kg/m$^3$, 430 kg/m$^3$, 440 kg/m$^3$, 450 kg/m$^3$, 460 kg/m$^3$, 470 kg/m$^3$, 480 kg/m$^3$, 490 kg/m$^3$, 500 kg/m$^3$, 550 kg/m$^3$, 600 kg/m$^3$, 650 kg/m$^3$, 700 kg/m$^3$, 750 kg/m$^3$, 800 kg/m$^3$, 850 kg/m$^3$, 900 kg/m$^3$, 950 kg/m$^3$, 1000 kg/m$^3$, 1050 kg/m$^3$, 1100 kg/m$^3$, 1150 kg/m$^3$, 1200 kg/m$^3$, 1250 kg/m$^3$, 1300 kg/m$^3$, 1350 kg/m$^3$, 1400 kg/m$^3$, 1450 kg/m$^3$, 1500 kg/m$^3$, 1520 kg/m$^3$, 1525 kg/m$^3$, 1550 kg/m$^3$, 1600 kg/m$^3$, 1650 kg/m$^3$, 1700 kg/m$^3$, 1750 kg/m$^3$, 1800 kg/m$^3$, 1850 kg/m$^3$, 1900 kg/m$^3$, 1950 kg/m$^3$, or 2000 kg/m$^3$.

In an embodiment of the first aspect the cellulose fiber source comprises or consist of wood chips and the compressing is applied to the largest area of surface of the wood chip or a generally a flat side of a particle.

In an embodiment the displacement liquor has an alkali charge selected from a range between 1% and 40% as effective alkali on cellulosic fiber source, preferably between 10% and 30%, more preferably between 15% and 25%, such as 1%, 2%, 3%, 4%, 5%, 6%, 7%, 8%, 9%, 10%, 15%, 20%, 25%, 30%, 35%, or 40%, effective alkali as NaOH.

In an embodiment the displacement is carried out at a temperature selected from a range between 70° C. and 200° C., preferably between 100° C. and 185° C., more preferably between 140° C. and 165° C., such as 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C. or 200° C.

In an embodiment the displacement is carried out by displacing the black liquor with the displacement liquor with a displacement liquor velocity selected from a range between 0.35 mm/s and 35 mm/s, such as 0.35 mm/s, 0.4 mm/s, 0.45 mm/s, 0.5 mm/s, 0.6 mm/s, 0.7 mm/s, 0.8 mm/s, 0.9 mm/s, 1 mm/s, 2 mm/s, 3 mm/s, 4 mm/s, 5 mm/s, 6 mm/s, 7 mm/s, 8 mm/s, 9 mm/s, 10 mm/s, 15 mm/s, 20 mm/s, 25 mm/s, 30 mm/s, 31 mm/s, 32 mm/s, 33 mm/s, 34 mm/s or 35 mm/s.

In an embodiment the temperature and alkali charge are not changed between the cooking and the compressing steps.

In an embodiment the porosity of the column is at least 0.25.

In an embodiment displacement is carried out to a consistency selected from a range between 6% and 15% by weight, such as 6%, 7%, 8%, 9%, 10%, 11%, 12%, 13%, 14% or 15% by weight.

In an embodiment of displacement, a displacement screen is used to separate lignin fraction from the cellulose containing fraction. In an embodiment the displacement screen is a plate equipped with slots or holes, which permits the liquor to go through but the raw material remains in the column.

In an embodiment the cooked cellulose fiber source is diluted to a consistency selected between 2% and 35% by weight, such as 2%, 3%, 4%, 5%, 6%, 7%, 8%, 9%, 10%, 11%, 12%, 13%, 14%, 15%, 20%, 25%, 30%, 31%, 32% 33%, 34% or 35% by weight.

In an embodiment of the fourth aspect, refining is carried out by a pulp refiner, such as a conical pulp refiner, a disk pulp refiner or Masuko mass collider.

Embodiments of the aspects of this disclosure are next explained in detail referring to the FIGS. 1 to 4.

Figure 1:
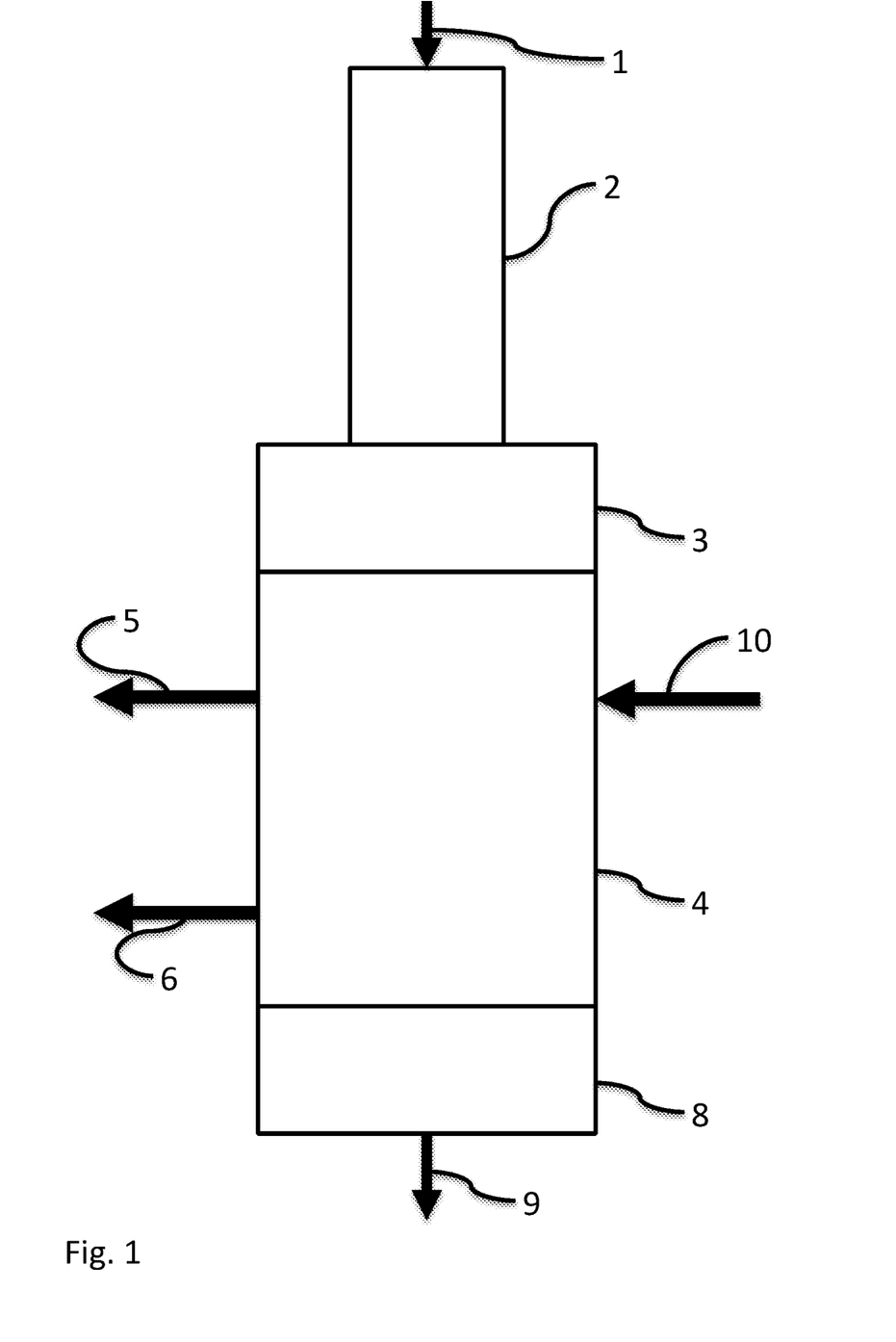
FIG. 1 schematically illustrates a digester system 1 for compressing lignin out of wood chips in kraft cooking.

An embodiment of the one digester process and digester system is explained with reference to FIG. 1. Wood chips are used as an example of cellulosic fiber source when referred to FIGS. 1 to 4. The wood chips which can be first impregnated with cooking chemicals with effective alkali charge of 1%-40% as NaOH are moved by flow 1 to a digester 2 at temperature 70° C.-200° C. After cooking in the digester 2 to kappa number 8-100, the chips go through a compressor 3 compressing the wood chips, carried out with a pressure selected between 35 kPa and 1000 kPa, to obtain a wood chip dry matter content more than 10%. After compressing the wood chips are pressed into a column in a displacement zone 4 with a pressure selected between 1 kPa and 250 kPa, preferably 2 kPa to 150 kPa, most preferably 5 kPa to 35 kPa. The displacement liquor can be added to the displacement vessel through at least one fluid connection 10 having an inlet to the displacement vessel. The displacement consistency in the displacement zone 4 of the wood chips can be higher than 5% to decrease the amount of water in the black liquor, which is containing the high molecular weight lignin. The displacement liquor temperature in the displacement zone 4 in counter current or co-current liquors 7 is between 70° C.-200° C. The alkali charge in the counter current or co-current liquors 7 as effective alkali is between of 1%-40% as NaOH. The velocity of the displacement liquor of the counter current or co-current liquors 7 is between 0.35 mm/s to 35 mm/s relative to the velocity of the chip column formed in in the displacement zone 4 by the action of the compressor 3. The cooked wood chips are diluted in a dilution zone 8 to a consistency between 2-35%. The displaced product of high molecular weight lignin is extracted in extraction flow 5 in the counter current case; and in the concurrent case by an extraction flow 6. Experimentally, this has been now shown to increase lignin molecular weight. Further, high cooking yield has also been proven by said experiments for lignin obtained by the present process and the apparatus. The cellulose product 9 is discharged from displacement zone through the dilution zone 8.

Figure 2:
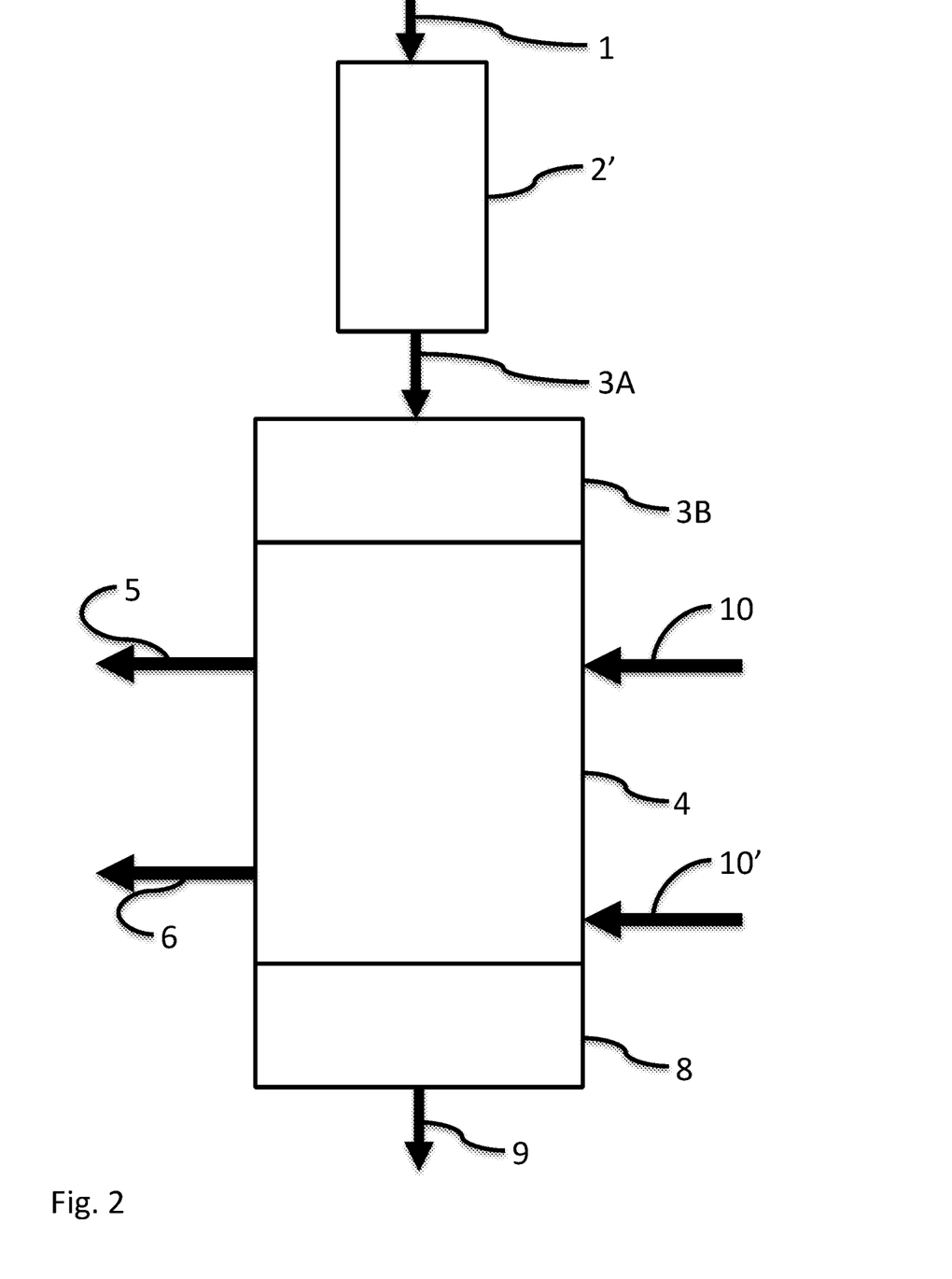
FIG. 2 schematically illustrates a digester system 2 for compressing lignin out of wood chips in kraft cooking.

An embodiment of the two digester process and a digester system is explained with referring to FIG. 2. Wood chips are used as an example of cellulosic fiber source when referred to FIG. 2. The wood chips which can be first impregnated with cooking chemicals with effective alkali charge of 1%-40% as NaOH are moved by flow 1 to a digester unit 2' at temperature 70° C.-200° C. After cooking in the digester unit 2' to kappa number 8-100, the wood chips are transferred via a transfer line 3A to the separate displacement vessel 4 with a compressing unit 3B at top of the displacement vessel 4. The chips go through compressing which is carried out with a pressure selected from the range between 35 kPa and 1000 kPa or so that the wood chips dry matter content is more than 10% by weight. After compressing the wood chips are pressed into a column in the displacement vessel 4 with pressure of 1 kPa to 250 kPa. The displacement consistency in the displacement vessel 4 of the wood chips can be higher than 5% to decrease the amount of water in the black liquor, which is containing the high molecular weight lignin. The displacement liquor can be added to the displacement vessel through at least one fluid connection 10, 10' having an inlet in the displacement vessel. The displacement liquor temperature in the displacement vessel 4 in the counter current or co-current liquors 7 is between 70° C. and 200° C. The alkali charge in the counter current or co-current liquors 7 as effective alkali is selected from the range between of 1% and 40% effective alkali as NaOH. The velocity of the displacement liquor of the counter current or co-current liquors 7 is between 0.35 mm/s and 35 mm/s relative to the velocity of the chip column in the displacement zone 4. The cooked wood chips are diluted in the dilution zone 8 to a consistency between 2%-35%. The displaced product of high molecular weight lignin is extracted by extraction flow 5 in the counter current case, and in the concurrent case by the extraction flow 6. Experimentally, this has been now shown to increase lignin molecular weight in lignin production. Further, high cooking yield has also been proven by said experiments for lignin obtained by the method of the present invention. The cellulose 9 is discharged from displacement zone 7 through a dilution zone 8.

Figure 3:
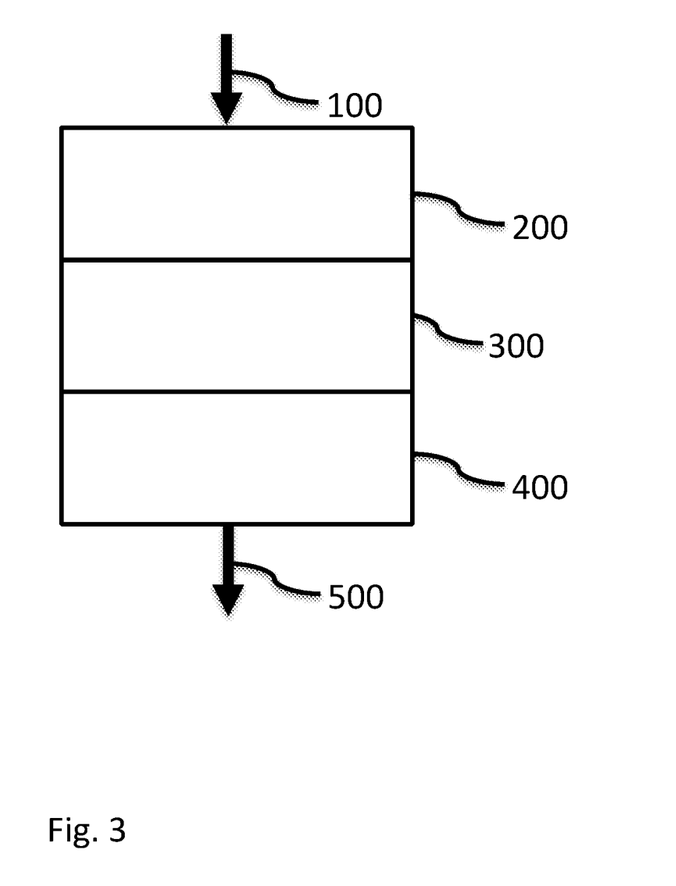
FIG. 3 illustrates the schematic process to compress the wood chips to press out the lignin.

An embodiment of the compressing unit 300 is presented in the FIG. 3. The wood chips are fed to compressing 200 by feed, the feeding being carried out e.g. by screw, pump or high pressure feeder. The compressing in the compression part 200 can be carried out by feeding 100 wood chips through two e.g. rotating cylinders, one rotating cylinder in a pipe, or piston or screw, or any other means of compressing which compresses the chips with a pressure selected between 35 kPa and 1000 kPa so that the wood chips compress to a density between 350 kg/m$^3$ and 1525 kg/m$^3$, preferably between 650 kg/m$^3$ and 1525 kg/m$^3$, most preferably between 800 kg/m$^3$ and 1520 kg/m$^3$. The wood chips are then discharged 400 e.g. with screw, pump or high pressure feeder from the compression 200.

Figure 4:
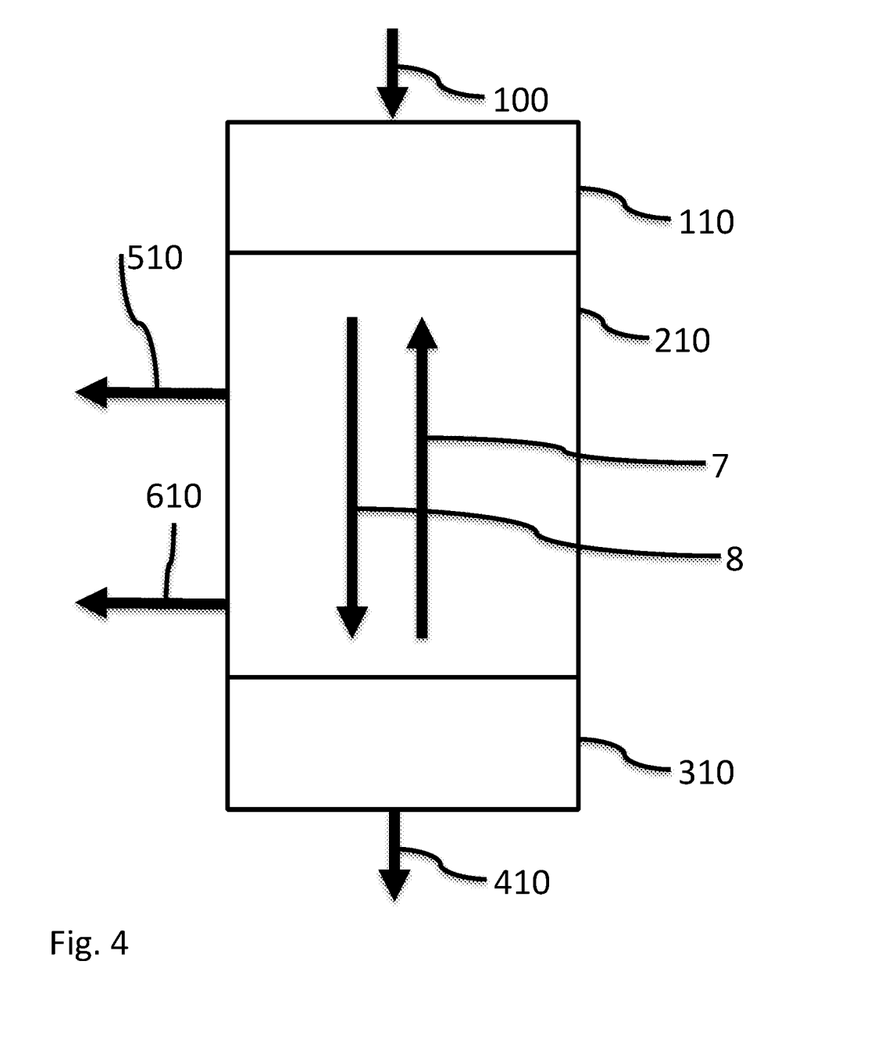
FIG. 4 schematically represents the displacement process for high molecular weight lignin containing black liquor from compressed wood chips.

An embodiment of the displacement zone is presented in the FIG. 4. In this embodiment the cellulosic fiber source from the compressor is pressed into a column in the displacement zone 210 with pressure selected from the range between 1 and 250. This can be done e.g. by screw, pump or high pressure feeder from the compression. The displacement consistency in the displacement zone 210 of the wood chips is preferably higher than 10% to decrease the amount of water in the black liquor, which is containing the high molecular weight lignin. Displacement liquor temperature in the displacement zone 210 in the counter current or co-current liquors (reference sign 710 or 810, respectively) is selected from the range between 70 and 200° C. The alkali charge in the counter current or co-current liquors (reference sign 710 or 810) as effective alkali is selected from the range between 1% and 40% as NaOH, preferably between 1% and 30%, more preferably between 1% and 25%, and most preferably between 1% and 15%. The velocity of the displacement liquor of the counter current or co-current liquors (reference sign 710 or 810) is between 0.35 mm/s and 35 mm/s relative to the velocity of the chip column in the displacement zone 210. The displaced product of high molecular weight lignin is extracted, flow 510, in the counter current case and in the concurrent case by extraction flow 610. The vessel is preferably provided with extraction screens to maintain the lignin and cellulose products in separate flows. The cooked wood chips are diluted in dilution zone 310 to a consistency between 2% and 35%, preferably between 5% and 20%, more preferably between 8% and 12%. The cellulose product is discharged from displacement zone 210 through a dilution zone 310 and can be further delignified e.g. by oxygen, and/or bleached to a target brightness level required by the end product. Bleaching can be carried out with chlorine dioxide, peroxide, or alkali extraction.

EXAMPLES

The effects obtainable by embodiments of the method of the present disclosure are proven by the following experiments, which should not be considered as limiting the scope of the present disclosure. With abbreviation REF is referred to conventional methods i.e. kraft cooking without compressing step according to the present disclosure. REF is compared to a process according to the present disclosure with compressing step (abbreviation COM).

Example 1

In this example increase of black liquor lignin molecular weight and cooking time to constant kappa number was measured. Eucalyptus and pine wood pulps were produced both according to disclosure (COM) and as reference (REF), conventionally with cooking at 165° C. with 20% eucalyptus alkali charge (as NaOH) and 25% pine eucalyptus alkali charge (as NaOH). Results are shown in table 1. The wood chips were compressed within a laboratory vessel equipped with a piston with pressure of 263 kPa and chip column pressure was 6 kPa with washing liquor speed of 1.1 mm/s.

TABLE 1

| Sample | Lignin Mw | Cooking time decrease, min |
|---|---|---|
| REF Eucalyptus | 2300 | — |
| REF Pine | 2110 | — |
| COM Eucalyptus | 3600 | 36 min |
| COM Pine | 4100 | 25 min |

According to table 1 the lignin molecular weight increases and cooking time decreases when cooking is done according to the disclosure.

Example 2

In this example of cellulose sheet softness measured with a Tissue Soft Analyser, by EMTEC device, eucalyptus and pine wood pulps were produced both according to disclosure (COM) and as reference (REF), conventionally with cooking at 165° C. with 20% eucalyptus alkali charge (as NaOH) and 25% pine eucalyptus alkali charge (as NaOH). Pulps were further oxygen delignified and bleached to brightness of ISO 90. Results are shown in table 2. The wood chips were compressed with pressure of 263 kPa. The wood chips were compressed with pressure of 263 kPa and chip column pressure was 6 kPa with washing liquor speed of 1.1 mm/s.

TABLE 2

| Sample | Handfeel Softness TSA, EMTEC |
|---|---|
| REF Eucalyptus | 24 |
| REF Pine | 17 |
| COM | 41 |

TABLE 2-continued

| Sample | Handfeel Softness TSA, EMTEC |
|---|---|
| Eucalyptus COM Pine | 35 |

According to table 2 cellulose sheet handfeel softness increases when cooking is done according to the disclosure.

Example 3

In this example eucalyptus and pine wood pulps were produced both according to disclosure (COM) and as reference (REF), conventionally with cooking at 165° C. with 20% eucalyptus alkali charge (as NaOH) and 25% pine eucalyptus alkali charge (as NaOH). Results are shown in table 3. The wood chips were compressed with pressure of 263 kPa and chip column pressure was 6 kPa with washing liquor speed of 1.1 mm/s. The wet sheets were pressed with an MTS device to simulate dryness after a paper machine press section.

TABLE 3

| Sample | Dry matter content, (%) |
|---|---|
| REF Eucalyptus | 46 |
| REF Pine | 48 |
| COM Eucalyptus | 49 |
| COM Pine | 51 |

According to table 3 cellulose sheet dry matter increases when cooking is done according to the disclosure.

Example 4

In this example eucalyptus and pine wood pulps were produced both according to disclosure (COM) and as reference (REF), conventionally with cooking at 165° C. with 20% eucalyptus alkali charge (as NaOH) and 25% pine eucalyptus alkali charge (as NaOH). Results are shown in table 4. The wood chips were compressed with pressure of 263 kPa and chip column pressure was 6 kPa with washing liquor speed of 1.1 mm/s. The pulps were refined with Masuko mass collider (1 pass) and fines content was measured with Kajaani FS-300.

TABLE 4

| Sample | Fines Content, (%) |
|---|---|
| REF Eucalyptus | 11 |
| REF Pine | 10 |
| COM Eucalyptus | 26 |
| COM Pine | 35 |

According to table 4 cellulose fines content increases when cooking is done according to the disclosure.

Example 5

In this example pulp yields were measured, eucalyptus and pine wood pulps were produced both according to disclosure (COM) and as reference (REF), conventionally with cooking at 165° C. with 20% eucalyptus alkali charge (as NaOH) and 25% pine eucalyptus alkali charge (as NaOH). Results are shown in table 5. The wood chips were compressed with pressure of 263 kPa and chip column pressure was 6 kPa with washing liquor speed of 1.1 mm/s

TABLE 5

| Sample | Cooking yield, % |
|---|---|
| REF Eucalyptus kappa 17 | 51 |
| REF Pine, kappa 28 | 47 |
| COM Eucalyptus, kappa 17 | 52.3 |
| COM Pine, kappa 28 | 48.1 |

According to table 5 cooking yield increases when cooking is done according to the disclosure.

Example 6

In this example lignin yield and consistency was compared to previous cooking method disclosed in PCT/FI2011/050651 (Prev.) after cooking. In the COM samples the wood chips were compressed with pressure of 263 kPa and chip column pressure was 6 kPa with washing liquor speed of 1.1 mm/s. In previous art no compression was used.

TABLE 6

| Sample | Lignin yield, % from wood | Lignin Consistency, (%) |
|---|---|---|
| Prev. Eucalyptus kappa 17 | 22% | 8 |
| Prev. Pine, kappa 28 | 14.1% | 6 |
| COM Eucalyptus, kappa 17 | 24% | 12 |
| COM Pine, kappa 28 | 16% | 8 |

As the results confirm, the present method improves the yield and consistency of the recovered lignin from both raw materials and with different kappa values.

Example 7

In this example fiber curl (measured with Fiber Tester) was compared to previous cooking method disclosed in PCT/FI2011/050651 (Prev.) after cooking.

TABLE 7

| Sample | Curl, % |
|---|---|
| Prev. Eucalyptus kappa 17 | 18 |
| Prev. Pine, kappa 28 | 20 |
| COM Eucalyptus, kappa 17 | 12 |
| COM Pine, kappa 28 | 14 |

As the results confirm, the present method improves the fiber curl of both raw materials and with different kappa values.

Example 8

In this example was cellulose reactivity was measured with Fock reactivity test for eucalyptus and pine wood pulps were produced with optional pre-hydrolysis and neutralization steps both according to invention (COM) and as reference (REF), conventionally with cooking at 165° C. with 20% eucalyptus alkali charge (as NaOH) and 25% pine eucalyptus alkali charge (as NaOH). Results are shown in table 5. The wood chips were compressed with pressure of 263 kPa and chip column pressure was 6 kPa with washing liquor speed of 1.1 mm/s

TABLE 8

| Sample | Fock reactivity, % |
| --- | --- |
| REF. Eucalyptus | 48 |
| REF. Pine | 45 |
| COM Eucalyptus | 68 |
| COM Pine | 62 |

As the results confirm, the present method improves the reactivity of both raw materials.

The foregoing description has provided, by way of non-limiting examples of particular implementations and embodiments of the disclosure, a full and informative description of the best mode presently contemplated by the inventor for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the disclosure.

Furthermore, some of the features of the afore-disclosed embodiments of this disclosure may be used to advantage without the corresponding use of other features. As such, the foregoing description shall be considered as merely illustrative of the principles of the present disclosure, and not in limitation thereof. Hence, the scope of the disclosure is only restricted by the appended patent claims.

The invention claimed is:

1. A cooking method for production of high molecular weight lignin having a molecular weight of more than 2300 and pulp comprising:
   i. cooking a cellulosic fiber source comprising wood chips in a cooking liquor at a temperature selected from a range between 120° C. and 180° C. to a kappa number selected from a range between 100 and 5 to form a cooked cellulosic fiber source;
   ii. compressing the cooked cellulosic fiber source at the cooking temperature with a pressure selected from a range between 35 kPa and 1000 kPa, to provide a compressed cellulose fraction with a consistency higher than 10% by weight and a density selected from a range between 350 kg/m³ and 2000 kg/m³ in a black liquor comprising high molecular weight lignin comprising a molecular weight of more than 2300;
   iii. displacing the black liquor with a displacing liquor by pressing the compressed cellulose fraction in the black liquor with a pressure selected from a range between 1 kPa and 250 kPa to form a column having a consistency of at least 5% by weight, or a column porosity of at least 0.25, followed by displacing the black liquor with a displacing liquor having a lignin content lower than that in the black liquor, and wherein the pressure is lower than that in step ii;
   iv. recovering a high molecular weight lignin fraction having a molecular weight of more than 2300 from the displacing liquor;
   v. and recovering pulp from the compressed cellulose fraction.

2. The method of claim 1 comprising pre-hydrolysis and neutralization before step i, wherein pre-hydrolysis comprises pre-hydrolyzing cellulosic fiber source with steam at temperatures between 100° C. and 200° C. and neutralizing is carried out subsequently with an alkali charge selected between 1% and 25% effective alkali as NaOH.

3. The cooking method of claim 1 wherein in the step i an alkali charge of 10%, 15%, 20%, 25 30%, 35% or 40% as effective alkali as NaOH is used.

4. The cooking method of claim 1 wherein the displacing liquor has an alkali charge selected from a range between 1% and 40% as effective alkali on cellulosic fiber source.

5. The cooking method of claim 1 wherein the displacing step is carried out at a temperature selected from a range between 70° C. and 200° C.

6. The cooking method of claim 1 wherein the displacing step is carried out by displacing the black liquor with a displacement liquor velocity selected from the range between 0.35 mm/s and 35 mm/s.

7. The cooking method of claim 1 wherein the temperature and alkali charge are not changed between cooking and compressing steps.

8. A method for producing pulp with high fines content comprising:
   a. producing pulp according to the cooking method of claim 1; and
   b. refining the cellulose fraction recovered in the step v to obtain fines having cellulose fiber wall constituents with a number average width between 1 nm and 1000 nm and a number average length between 1 nm and 4 mm;
   wherein the fines content of the pulp is at least about 26%.

* * * * *